(12) United States Patent
McGuire et al.

(10) Patent No.: US 8,285,860 B2
(45) Date of Patent: Oct. 9, 2012

(54) EFFICIENT SERVICE DISCOVERY FOR PEER-TO-PEER NETWORKING DEVICES

(75) Inventors: Rory L. P. McGuire, San Jose, CA (US); Michael Van Milligan, San Francisco, CA (US); Jason Conn, San Francisco, CA (US); Joshua Graessley, Sunnyvale, CA (US); Augustin Prats, Mountain View, CA (US); Brian Tucker, San Jose, CA (US)

(73) Assignee: Apple Inc., Cupertino, CA (US)

( * ) Notice: Subject to any disclaimer, the term of this patent is extended or adjusted under 35 U.S.C. 154(b) by 205 days.

(21) Appl. No.: 12/687,814

(22) Filed: Jan. 14, 2010

(65) Prior Publication Data

US 2010/0235525 A1    Sep. 16, 2010

Related U.S. Application Data

(63) Continuation-in-part of application No. 12/405,130, filed on Mar. 16, 2009.

(60) Provisional application No. 61/240,509, filed on Sep. 8, 2009, provisional application No. 61/249,582, filed on Oct. 7, 2009.

(51) Int. Cl.
G06F 15/16 (2006.01)
(52) U.S. Cl. ........................................................ 709/228
(58) Field of Classification Search .................. 709/228
See application file for complete search history.

(56) References Cited

U.S. PATENT DOCUMENTS

| | | | |
|---|---|---|---|
| 5,794,446 A | 8/1998 | Earley et al. | |
| 5,852,661 A | 12/1998 | Chen | |
| 6,463,078 B1 | 10/2002 | Engstrom et al. | |
| 6,523,108 B1 * | 2/2003 | James et al. | 712/224 |
| 7,097,562 B2 | 8/2006 | Gagner | |
| 7,103,313 B2 | 9/2006 | Heinonen et al. | |
| 7,133,896 B2 | 11/2006 | Ogdon et al. | |
| 7,171,475 B2 * | 1/2007 | Weisman et al. | 709/227 |
| 7,249,182 B1 * | 7/2007 | Heinonen et al. | 709/227 |

(Continued)

FOREIGN PATENT DOCUMENTS

EP    2293517    3/2011

(Continued)

OTHER PUBLICATIONS

International Search Report and Written Opinion mailed Jul. 26, 2010, for International Application No. PCT/US2010/036490, filed May 27, 2010.

(Continued)

*Primary Examiner* — Moustafa M Meky
*Assistant Examiner* — Hee Kim
(74) *Attorney, Agent, or Firm* — Blakely, Sokoloff, Taylor & Zafman LLP

(57) ABSTRACT

Techniques for discovering and/or advertising services are described herein. A first bitmask is received from a remote device over a wireless network, the first bitmask having one or more bits that have a predetermined logical value. Each bit represents a particular service provided by the remote device. A logical operation is performed between the first bitmask and a second bitmask locally generated within a local device, where the second bitmask represents a service being searched by the local device. It is determined whether the remote device is potentially capable of providing the service being searched by the local device based on a result of the logical operation.

25 Claims, 7 Drawing Sheets

U.S. PATENT DOCUMENTS

| | | | |
|---|---|---|---|
| 7,299,257 | B2 | 11/2007 | Boyer et al. |
| 7,333,464 | B2 | 2/2008 | Yang et al. |
| 7,415,711 | B2 | 8/2008 | Chew et al. |
| 7,491,123 | B2 | 2/2009 | Smith |
| 7,827,139 | B2 | 11/2010 | Schauser et al. |
| 7,831,673 | B1 | 11/2010 | Cohen et al. |
| 2002/0021903 | A1 | 2/2002 | Ito et al. |
| 2003/0177187 | A1 | 9/2003 | Levine et al. |
| 2003/0229900 | A1 | 12/2003 | Reisman |
| 2004/0003039 | A1 | 1/2004 | Humphrey et al. |
| 2004/0076136 | A1 | 4/2004 | Beach |
| 2004/0087274 | A1 | 5/2004 | Ekberg et al. |
| 2004/0122957 | A1 | 6/2004 | Edwards et al. |
| 2004/0172626 | A1 | 9/2004 | Jalan et al. |
| 2004/0253923 | A1 | 12/2004 | Braley et al. |
| 2004/0267876 | A1 | 12/2004 | Kakivaya et al. |
| 2005/0071845 | A1 | 3/2005 | Kallio et al. |
| 2005/0088980 | A1 | 4/2005 | Olkkonen et al. |
| 2005/0138173 | A1 | 6/2005 | Ha et al. |
| 2005/0232242 | A1 | 10/2005 | Karaoguz et al. |
| 2006/0039354 | A1 | 2/2006 | Rao et al. |
| 2006/0073869 | A1 | 4/2006 | LeMay et al. |
| 2006/0190715 | A1* | 8/2006 | Miller ............... 713/150 |
| 2006/0215601 | A1 | 9/2006 | Vleugels et al. |
| 2007/0060305 | A1 | 3/2007 | Amaitis et al. |
| 2007/0117635 | A1 | 5/2007 | Spanton et al. |
| 2007/0130253 | A1 | 6/2007 | Newson et al. |
| 2007/0155326 | A1 | 7/2007 | Lin et al. |
| 2007/0195760 | A1 | 8/2007 | Rahman et al. |
| 2007/0218997 | A1 | 9/2007 | Cho |
| 2008/0003946 | A1 | 1/2008 | Lee et al. |
| 2008/0009344 | A1 | 1/2008 | Graham et al. |
| 2008/0014951 | A1 | 1/2008 | Laroia et al. |
| 2008/0220878 | A1 | 9/2008 | Michaelis |
| 2008/0291916 | A1 | 11/2008 | Xiong et al. |
| 2008/0320041 | A1 | 12/2008 | Engelsma et al. |
| 2009/0063686 | A1 | 3/2009 | Schmidt et al. |
| 2009/0113482 | A1 | 4/2009 | Kawada et al. |
| 2009/0132935 | A1 | 5/2009 | Van Zwol |
| 2009/0135805 | A1 | 5/2009 | Lee et al. |
| 2009/0265661 | A1 | 10/2009 | Shuster |
| 2010/0041457 | A1 | 2/2010 | Cook et al. |
| 2010/0233960 | A1 | 9/2010 | Tucker |
| 2010/0235523 | A1 | 9/2010 | Garcia et al. |
| 2010/0235525 | A1 | 9/2010 | McGuire et al. |

FOREIGN PATENT DOCUMENTS

| | | |
|---|---|---|
| GB | 2415325 | 12/2005 |
| JP | 2002055896 | 2/2002 |
| JP | 2007110186 | 4/2007 |
| JP | 2008097297 | 4/2008 |
| WO | WO 02/059752 | 8/2002 |
| WO | WO 03/003610 | 1/2003 |
| WO | WO 03/029966 | 4/2003 |
| WO | WO 2007136622 | 11/2007 |
| WO | WO 2010/107703 | 9/2010 |
| WO | WO 2011/031354 | 3/2011 |

OTHER PUBLICATIONS

Extended European Search Report mailed Jan. 12, 2011, for European Application No. 10165028.1, filed Jun. 4, 2010.

Sedov, Igor et al., "Time and Energy Efficient Service Discovery in Bluetooth," VTC 2003—Spring, The 57th IEEE Semiannual Vehicular Technology Conference, Proceedings, Jeju, Korea, Apr. 22-25, 2003, IEEE Vehicular Technology Conference, IEEE, vol. 1, Apr. 22, 2003, pp. 418-422.

Preuss, Stephan "JESA Service Directory Protocol Efficient Service Discovery in Ad-Hoc Networks," Networking 2002: Networking Technologies, Services, and Protocols; Performance of Computer Networks; Mobile and Wireless Communications, Lecture Notes in Computer Science, Springer Berlin Heidelberg, Germany, May 19, 2002.

Kozierok, Charles M. "The TCP/IP Guide: DNS Name Notation and Message Compression Technique," Jun. 21, 2008, downloaded from http://web.archive.org/web/20080621054323/http://www.tcpipguide.com/free/t_DNSNameNotationandMessageCompressionTechnique-2.htm, Dec. 22, 2010.

Cheshire, Stuart et al., "DNS-Based Service Discovery <draft-cheshire-dnsext-dns=sd-05.txt>," Internet Engineering TaskForce, IETF; Standardworkingdraft, Internet Society (ISOC), Sep. 10, 2008.

"Jini Architecture Specification: Version 1.2" Sun Microsystems, Dec. 31, 2001, downloaded from www.sun.com/software/jini/specs/index, May 4, 2004.

Al-Masri, Eyhab et al., "Enhancing the Discovery of Mobile Services," WWW 2008, Beijing, China, Apr. 21-25, 2008, downloaded from www2.research.att.com/{rjana/MobEA2008/final/MobEA2008-02.pdf, Jun. 14, 2010, 10 pages.

Phua, Kia Ming et al., "A web-based Internet Java Phone for real-time voice communication," World Wide Web, Baltzer Science Publishers, Bussum, Netherlands, vol. 3, Jan. 2000, pp. 193-203.

Sukkar, Rafid A. et al., "Echo Detection and Delay Estimation Using a Pattern Recognition Approach and Cepstral Correlation," ICASSP 2007, vol. 4, Apr. 15, 2007, pp. 909-912.

Sacramento, Vagner et al., "MoCA: A Middleware for Developing Collaborative Applications for Mobile Users," IEEE Distributed Systems Online, IEEE Computer Society, vol. 5, No. 10, Oct. 2004.

Faller, Christof et al., "Robust Acoustic Echo Control Using a Simple Echo Path Model," Audiovisual Communications Laboratory, EPFL, Lausanne, Switzerland, 2006, 4 pages.

Wikipedia, Bonjour (software), http://en.wikipedia.org/wiki/Bonjour_(software), Mar. 6, 2009, 5 pages.

Wikipedia, Echo suppressor, http://en.wikipedia.org/wiki/Echo_suppressor, Mar. 6, 2009, 2 pages.

Wikipedia, NAT traversal, http://en.wikipedia.org/wiki/NAT_traversal, Mar. 6, 2009, 3 pages.

International Search Report and Written Opinion for international application No. PCT/US10/25445, mailed Apr. 16, 2010, 8 pages.

International Search Report and Written Opinion mailed Oct. 26, 2010, for International Application No. PCT/US2010/027334, filed Mar. 15, 2010.

United Kingdom Combined Search and Examination Report for United Kingdom application No. GB10039953.6, mailed Jun. 23, 2010, 3 pages.

International Preliminary Report on Patentability, mailed Sep. 29, 2011, for International Application No. PCT/US2010/027334, 11 pages.

International Preliminary Report on Patentability, mailed Sep. 29, 2011, for International Application No. PCT/US2010/025445, 6 pages.

European Search Report for European application No. EP10156166.0, mailed Aug. 9, 2010, 6 pages.

* cited by examiner

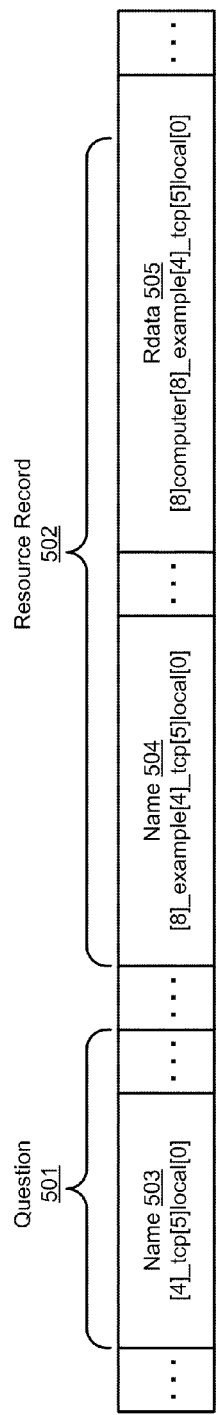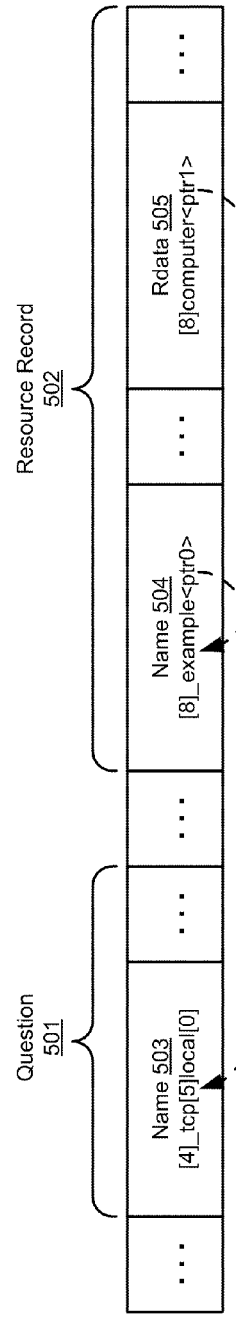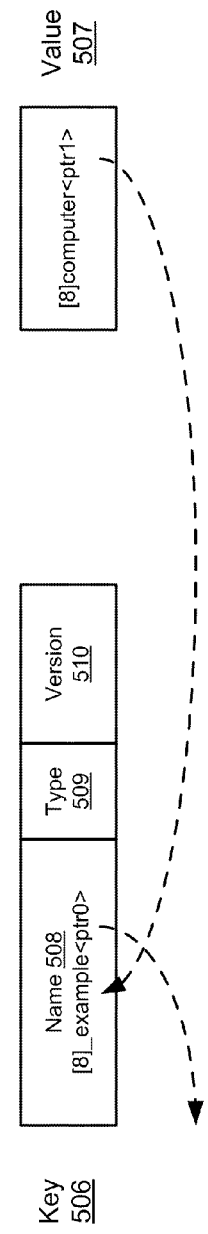
FIG. 5A
FIG. 5B
FIG. 5C

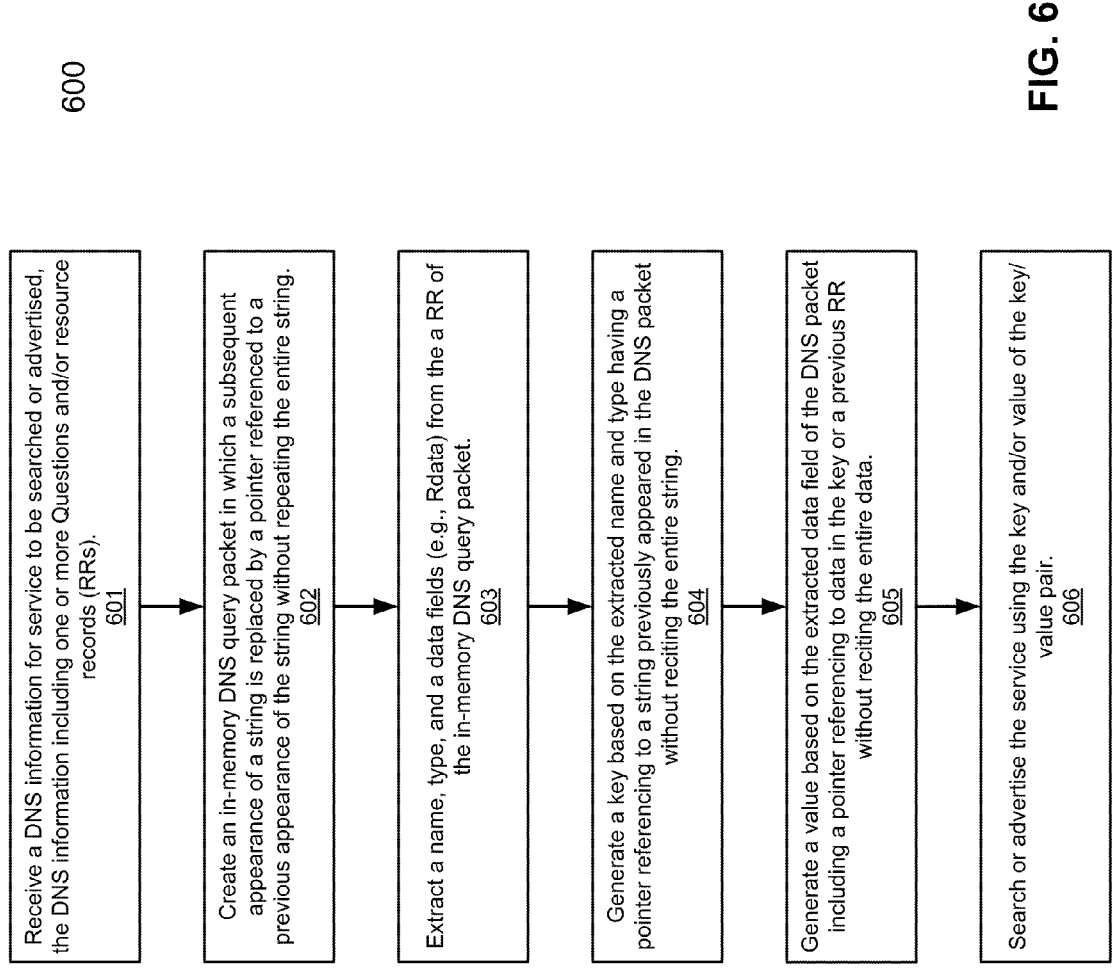

# EFFICIENT SERVICE DISCOVERY FOR PEER-TO-PEER NETWORKING DEVICES

RELATED APPLICATIONS

This application claims the benefit of U.S. Provisional Patent Application No. 61/240,509, filed Sep. 8, 2009 and U.S. Provisional Patent Application No. 61/249,582, filed Oct. 7, 2009. This application is also a continuation-in-part (CIP) of co-pending U.S. patent application Ser. No. 12/405,130, entitled "Service Discovery Functionality Utilizing Personal Area Network Protocols", filed Mar. 16, 2009.

This application is also related to co-pending U.S. patent application Ser. No. 12/479,745, filed Jun. 5, 2009 and U.S. patent application Ser. No. 12/479,586, filed Jun. 5, 2009. The disclosures of the above-identified applications are incorporated by reference in its entirety.

FIELD OF THE INVENTION

The present invention relates generally to peer-to-peer networking. More particularly, this invention relates to efficient service discovery for peer-to-peer networking devices.

BACKGROUND

Bluetooth (BT) wireless technology provides a manner in which many wireless devices may communicate with one another, without connectors, wires or cables. Current common uses for Bluetooth technology include those for headsets, cellular car kits and adapters. Moreover, Bluetooth technology is currently used for connecting a printer, keyboard, or mouse to a personal computer without cables. Also, since Bluetooth technology can facilitate delivery of large amounts of data, computers may use Bluetooth for connection to the Internet. Mobile communication devices such as cellular telephones may transfer photos, video or ring tones between them. Additional functionality is expected to continue to expand.

Before two Bluetooth enabled devices may communicate, the devices must be paired. Bluetooth pairing occurs when the two Bluetooth enabled devices become a trusted pair. To become a trusted pair, two Bluetooth devices must first complete a specific discovery and authentication process. When a first Bluetooth device recognizes a second Bluetooth device, and they complete a specific discovery and authentication process, each device can automatically accept communication between them.

Device discovery is the procedure a Bluetooth wireless device uses to locate nearby Bluetooth wireless devices with which it wishes to communicate. Exchanging the Bluetooth addresses of the discoverable devices, their friendly names and other relevant information via establishing a short term connection with each device in the vicinity can be a time consuming procedure. The procedure can involve having one Bluetooth wireless device transmitting an inquiry request to other Bluetooth wireless devices scanning for inquiry requests. A device that transmits the inquiry request (a potential master) is said to be discovering devices while the device that is scanning for inquiry requests is said to be discoverable.

Service discovery is another procedure in which one Bluetooth device searches for a service or application that may be provided by one or more remote Bluetooth devices. Similar to the device discovery procedure, the originated Bluetooth device (in this situation a client device) has to send an inquiry to other Bluetooth devices (in this situation a server device) to determine whether those Bluetooth devices have the service or application being searched available. This procedure usually takes relatively long time and it may consume more power. Devices with other communication systems, such as radios operating under a WiFi standard (e.g. IEEE 802.11n or other IEEE 802.11 standards) or under other wireless communication systems, can also take a relatively long time to discover each other and their respective services. There has been a lack of an efficient way to perform a service discovery procedure.

SUMMARY OF THE DESCRIPTION

Techniques for discovering and/or advertising services are described herein. According to one aspect of the invention, a first bitmask is received from a remote device over a wireless network, the first bitmask having one or more bits that have a predetermined logical value. Each bit represents a particular service provided by the remote device. A logical operation is performed between the first bitmask and a second bitmask locally generated within a local device, where the second bitmask represents a service being searched by the local device. It is determined whether the remote device is potentially capable of providing the service being searched by the local device based on a result of the logical operation.

According to another aspect of the invention, a key/value pair is generated based on an identifier of a service to be advertised by a local device. A hash operation is performed on a key of the key/value pair to generate a bitmask, the bitmask including a bit having a predetermined logical value. In response to an inquiry message from a remote device over a wireless network for searching for a service, the bitmask is transmitted to the remote device over the wireless network to allow the remote device to determine whether the local device is potentially capable of providing a service being searched based on the bitmask.

According to another aspect of the invention, one or more domain name system (DNS) resource records are received identifying a service available for access in a network. In response, a DNS packet is created based on the DNS resource records. This DNS packet includes domain names having pointers referenced to other domain name(s) that previously appear in the DNS packet without reciting the entire referenced domain name(s). A key/value pair is generated from each resource record, where each key/value pair is used to represent a service to be available for access in the network.

One or more embodiments described herein can use any one of a variety of wireless communications systems, such as, for example, Bluetooth compliant communication systems, WiFi compliant communication systems (e.g. radios operating under any one of the IEEE 802.11 standards such as the 802.11g standard or the IEEE 802.11n standard), WiMax compliant communication systems, radios operating under a cellular telephony standard, radios operating under a personal area network (PAN) standard, etc.

A service as described herein may be any one of a variety of applications or other facilities such as multi-player games (e.g. a card game on each of several devices, etc.) or collaborative applications (e.g. music creation applications, one on each of a plurality of devices, or document creation or authoring applications, one on each of a plurality of devices, etc.) or social networking applications (e.g. a Facebook application on each of a plurality of devices, or a LinkedIn application on each of a plurality of devices or a MySpace application on each of a plurality of devices, etc.), or voice chat applications, or text chat applications or instant messaging applications, etc. Examples of services and devices used in networking are also described in U.S. patent application Ser. No. 12/479,745, filed Jun. 5, 2009 and in U.S. patent application Ser. No. 12/479,586 filed Jun. 5, 2009, and both of these applications are incorporated herein by reference.

Data processing systems, machine readable storage media, and methods which include or use one or more embodiments of the invention are also described. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 5A is a block diagram illustrating a typical uncompressed DNS packet.

FIG. 5B is a block diagram illustrating a compressed DNS packet according to one embodiment.

FIG. 5C is a block diagram illustrating a key/value pair generated from a DNS packet according to one embodiment.

FIG. 6 is a flow diagram illustrating a method for generating a key/value pair according to one embodiment.

DETAILED DESCRIPTION

Figure 1:
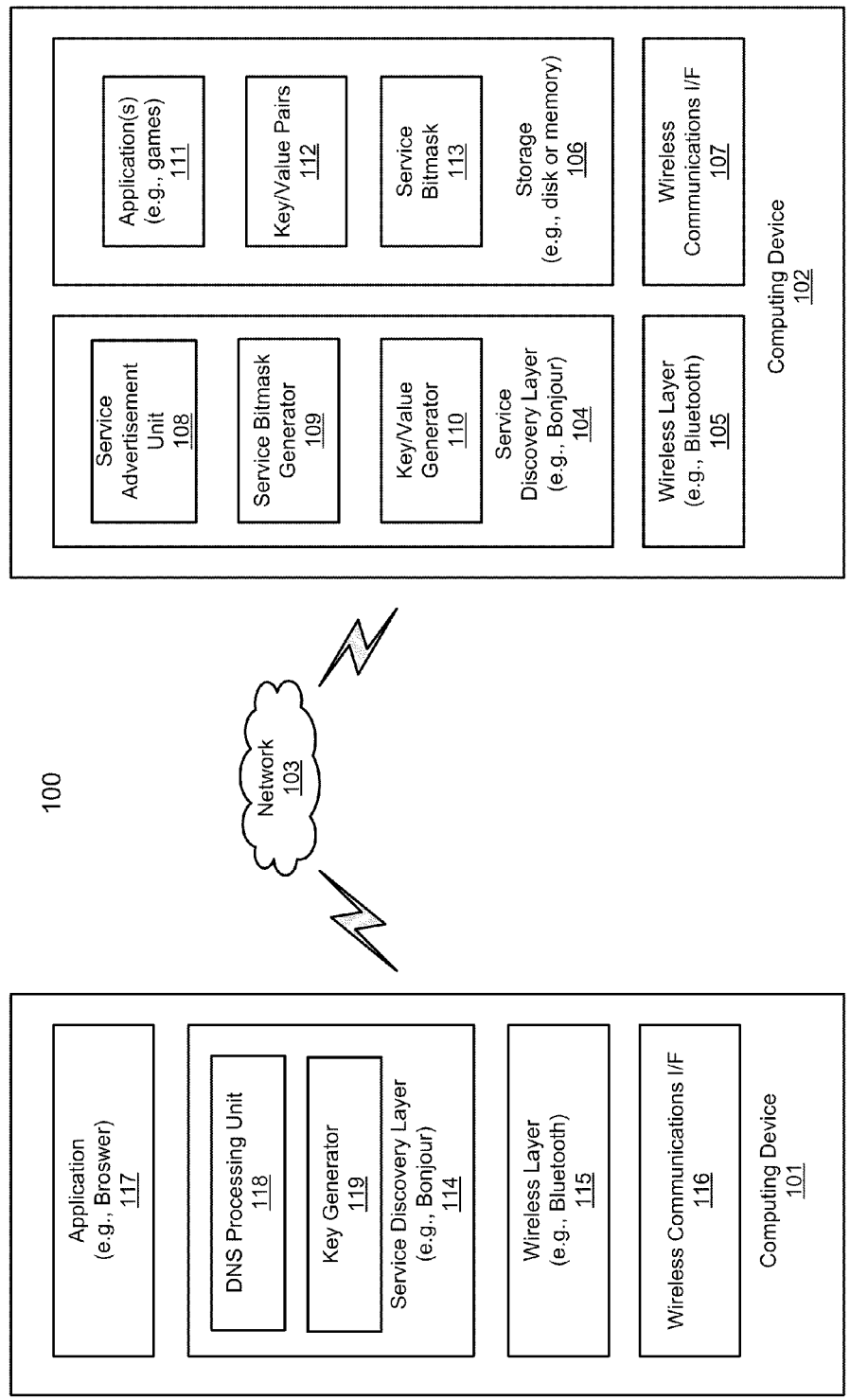
FIG. 1 is a block diagram illustrating a network configuration of a wireless environment according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

According to some embodiments, a key/value pair is used to represent a particular service advertised by a wireless computing device such as a Bluetooth device or other type of wireless device. When a wireless device has one or more services to be advertised in a wireless network, for each service to be advertised, one or more key/value pairs are generated. A key/value pair may be generated based on DNS information associated with the respective service. The key is used to indicate whether the wireless device is potentially capable of providing a particular service (e.g., a game) and the value includes further detailed information regarding the service to be provided. All the key/value pairs are hashed using a hash function (e.g., SHA-1 or MD5) to generate a bitmask. Each bit of the bitmask having a predetermined logical value (e.g., logical value of TRUE) indicates that the corresponding service is supported by the wireless device. In this situation, a wireless device that advertises one or more services acts as a server that provides the advertised services to one or more other wireless devices which are referred to as client devices. Note that a wireless device could be both a server device and a client device, dependent upon certain circumstances.

When another wireless device, as a client device, searches for a particular service in the network, a key is generated based on an identifier of the service being searched, such as, for example, domain name system (DNS) information associated with the service. In addition, a bitmask is generated from the key, for example, by hashing the key. An inquiry message (e.g., an extended inquiry or EI message) is then broadcast in the network by the client device. The inquiry message is received by all other wireless devices in a communications range.

In response to the inquiry, each server device that has a capability of providing services to others can respond to the inquiry by returning a bitmask representing services that are supported by the respective device as set forth above. When the client device receives the bitmasks from the server devices, for each bitmask received, the client device performs a predetermined operation (e.g., a logical AND operation) on the locally generated bitmask representing the service being searched and the bitmask received from a remote server device. The result of the operation is used to indicate that whether a particular server device potentially supports the service being searched.

If the result indicates that a server device may potentially provide the service being searched, the client device can then establish a connection (e.g., SDP connection) with the associated server device and send a request for more detailed information about the service. In return, the key/value pair corresponding to the service is received from the server device. As a result, the above protocol can quickly identify which of the server devices responding to the inquiry support the service being searched, before establishing a connection to obtain the detailed information of the service (e.g., key/value pair) from the server devices, which may take a relatively long time.

According to one embodiment, a key/value pair is generated based on DNS information associated with the service being searched and/or advertised. For example, a name field and type field of a resource record (RR) in a DNS packet (e.g., DNS query packet) may be used to generate the key of a key/value pair, while a data field (e.g., RData field) of the DNS packet may be used to generate the value of the key/value pair. A DNS packet may include multiple RRs. In one embodiment, a name field of an RR may include a compression pointer (CP) pointing to a character string previously appeared in another RR or Question of the DNS packet without duplicating the entire character string in the name field. Similarly, the data field (e.g., RData field) may also include a compression pointer pointing to a string that appears in another RR or Question, or alternatively in the name field of the current RR without duplicating the entire string. Thus, the value of a key/value pair may include a pointer pointing to the key of the key/value pair while the key of the key/value pair includes a pointer pointing to another RR or Question of the DNS packet. As a result, a size of a key/value pair can be further reduced for the purpose of service discovery.

FIG. 1 is a block diagram illustrating a network configuration of a wireless environment according to one embodiment. For example, network configuration 100 may be Bluetooth wireless environment or a WiFi wireless environment or other wireless environments. Referring to FIG. 1, network configuration 100 includes a first computing device 101 and a second computing device 102 communicatively coupled to each other over a network 103, which can be a variety of wireless networks such as a Bluetooth compatible network or a WiFi compatible network. For the purpose of illustrating, throughout this application, Bluetooth compatible network and device may be used as examples of a wireless network and device. However, it is not so limited; other types of wireless networks and devices may also be applied herein.

Devices 101-102 may be any kinds of wireless communications or computing devices. Devices 101-102 may be mobile phone devices, messaging devices, personal digital assistants (PDAs), notebook or laptop computers, mobile data terminals, gaming devices having a wireless communication interface, media players (e.g., audio and/or video players), etc. For example, devices 101-102 may be an iPhone™ or iPod™ device available from Apple Inc. of Cupertino, Calif. or other consumer electronic device.

In one embodiment, device 102 includes a processing protocol stack having multiple processing layers including, but is not limited to, a service discovery layer or unit 104, a wireless layer or unit 105. For example, service discovery layer 104 may be Bonjour compatible processing or protocol layer and the wireless layer 105 may be a Bluetooth compatible processing or protocol layer. While the description has, by way of example, referred to radios operating under a Bluetooth compliant or compatible communication system, it will be understood that other wireless communication systems can be used such as, for example, WiFi complaint or compatible communication systems (e.g. radios operating compatibly with one of the IEEE 802.11 standards such as the IEEE 802.11n standard), WiMax compliant or compatible communication systems, radios operating according to a cellular telephony standard, etc. In addition, device 102 includes storage 106 for storing data and a wireless communications interface 107 for communicating with another device such as device 101. The storage 106 may be a non-volatile memory such as a disk, a volatile memory such as a random access memory (RAM), or a combination thereof.

In one embodiment, service discovery layer 104 includes, but is not limited to, a service advertisement unit 108, a service mask generator 109, and a key/value pair generator 110. Service advertisement unit 108 is used to advertise one or more services such as applications or services 111 that device 102 can provide, where device 102 acts as a server device (e.g., service provider). When one or more services are advertised, key/value pair generator 110 is invoked to generate a key and a value, where the key/value pair is used to represent a particular service. The key is used to indicate whether the wireless device potentially supports a particular service (e.g., a game) and the value includes further detailed information regarding the service to be provided, which may be used to determine whether the device actually supports the particular service. The key/value pairs are then stored in storage 106 as key/value pairs 112.

In addition, all the key/value pairs that represent all services advertised by device 102 are used to generate a bitmask by service mask generator 109. In one embodiment, the key/value pairs are hashed using a hash function (e.g., SHA-1 or MD5, etc.) to generate a bitmask, which is stored in storage 106 as service mask 113. Each bit of the bitmask having a predetermined logical value (e.g., logical value of TRUE or ONE) indicates that the corresponding service is supported by device 102. In this situation, device 102 that advertises one or more services acts as a server device serving the advertised services to one or more other wireless devices (e.g., device 101) which are referred to as client devices. Note that a wireless device could be both a server device and a client device, dependent upon certain circumstances.

Similarly, according to one embodiment, device 101 includes a processing protocol stack including, but is not limited to, a service discovery layer or unit 114 and a wireless layer or unit 115. Service discovery layer 114 may be a Bonjour compatible processing or protocol layer and wireless layer 115 may be a Bluetooth compatible processing or protocol layer. While the description has, by way of example, referred to radios operating under a Bluetooth compliant or compatible communication system, it will be understood that other wireless communication systems can be used such as, for example, WiFi complaint or compatible communication systems (e.g. radios operating compatibly with one of the IEEE 802.11 standards such as the IEEE 802.11n standard), WiMax compliant or compatible communication systems, radios operating according to a cellular telephony standard, etc. In one embodiment, service discovery layer 114 includes a DNS processing unit 118 and a key generator 119.

When application 117, such as a browser application, searches for a particular service in the network, a DNS packet (e.g., DNS query packet) is generated by DNS processing unit 118. In addition, key generator 119 generates a key based on the DNS packet. The wireless layer 115 generates a bitmask based on the key, for example, by performing a hash operation on the key using a variety of hash functions (e.g., SHA-1 or MD5, etc.) and stores the key and the bitmask in a local memory (not shown) of device 101. Wireless layer 115 then broadcasts an inquiry message (e.g., an extended inquiry or EI message) in the network, via wireless interface logic or circuit 116. The inquiry message is received by all other wireless device in a communications range, including device 102.

In response to the inquiry, each server device that is potentially capable of providing services to others can respond to the inquiry by returning a bitmask representing services that are supported by the respective device. In this example, the inquiry message is received by device 102. In response to the inquiry message, wireless layer 105 is configured to retrieve a service bitmask 113 from storage 106 and returns data representing service bitmask 113 to device 101 via wireless interface logic or circuit 107.

When device 101 receives the bitmask from device 102, wireless layer 115 compares the bitmask received from device 102 with the one stored in the local memory to determine whether there is any corresponding bits in both bitmasks having an identical logical value, which indicates that an associated service is supported by device 102. For example, wireless layer 115 may perform a logical AND operation between two bitmasks.

If the result indicates that the service being searched by application 117 is potentially supported by device 102, wireless layer 115 may then establish a session connection (e.g., session description protocol or SDP connection) with device 102 and send a request for more detailed information about the service. In one embodiment, device 101 may request for all key/value pairs supported by the bitmask from device 102, including the key/value pair corresponding to the service being searched. The wireless processing unit 115 may "walk through" all the key/value pairs received from device 102. For example, for each key/value pair, the wireless processing unit 115 may compare or match a key of each key/value pair with the one stored locally corresponding to the service being searched to identify the key/value pair corresponding to the service being searched.

Once the key/value pair corresponding to the service being searched is received and identified, wireless layer 115 passes such a key/value pair to service discovery layer 118. Service discovery layer 118 evaluates the key/value pair and informs application 117 whether the service being searched is actually supported by device 102. As a result, the above protocol can quickly identify which of the server devices responding to the inquiry potentially support the service being searched, before establishing a connection to obtain the detailed information of the service from the server devices to determine whether the server devices actually support the service being searched, which may take a relatively long time.

Note that as described above, the architectures of devices 101-102 may be similar or identical. Dependent upon a specific circumstance, devices 101-102 may operate as a client device and/or a server device. Thus, certain functional units may perform some operations that are similar or identical when a device is operating as a client device, a server device, or both a client and server devices. For example, service discovery layer 114 may be implemented similar to the service discovery layer 104, while wireless layer 115 may be implemented similar to wireless layer 105. Although not shown, service discovery layer 114 may include other functional units similar to service advertisement unit 108, service mask generator 109, and/or key/value pair generator 110, etc. Likewise, service discovery layer 104 may include other functional units similar to DNS processing unit 118 and/or key generator 119, etc. For example, the key generated by service discovery unit 114 may be similar or identical to the key generated by service discovery unit 104 for the same service. Note that some or all of the components of devices 101-102 of FIG. 1 may be implemented in software, hardware, or a combination of both.

Figure 2:
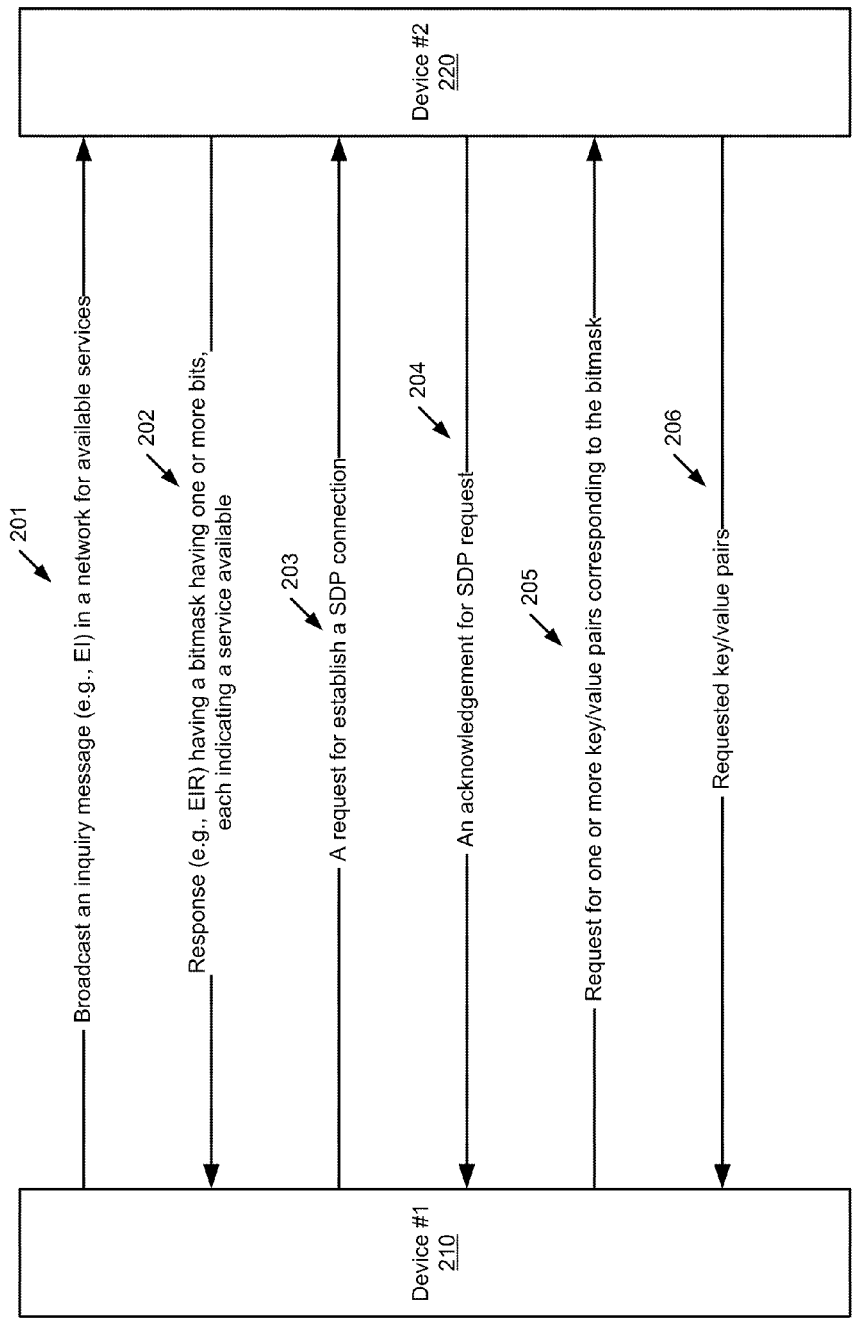
FIG. 2 is a transactional diagram illustrating transactions between two peer-to-peer networking devices according to one embodiment of the invention.

FIG. 2 is a transactional diagram illustrating transactions between two peer-to-peer networking devices according to one embodiment of the invention. Referring to FIG. 2, for example, device 210 may be implemented as part of device 101 of FIG. 1 and device 220 may be implemented as part of device 102 of FIG. 1. When an application (e.g., browser) of device 210 searches for a service (e.g., game), a key and a bitmask are generated based on DNS information associated with the service. At transaction 201, an inquiry (e.g., EI message) is broadcast in the network and in this example, received by device 220. In return, during transaction 202, device 202 transmits a service bitmask having one or more bits with a predetermined logical value indicating one or more services that device 220 can provide. Device 210 examines the service bitmask received from device 220 in view of the bitmask for the service being searched to quickly identify whether the searched service is potentially supported by device 220.

If it is determined that the service being searched is supported by device 220, at transaction 203, device 210 sends a request to establish a session connection (e.g., SDP connection), and at transaction 204, device 220 acknowledges the request to complete the establishment of the session connection.

Once the connection has been established, during transaction 205, device 210 requests for one or more key/value pairs from device 220, and receives such key/value pairs from device 220 during transaction 206. Note that, device 220 may have multiple services that corresponding to the same bit of the bitmask. Based on the bitmask, device 210 can only determine that device 220 "may be" or "potentially" capable of providing the service being searched. The techniques described throughout this application allow a device to quickly determine whether a peer device "may be" or "potentially" capable of providing a particular service without having to establish a connection with the peer device, which may take a relatively long time. Only when it is determined that the peer device may potentially provide the particular service, a session connection is then established to obtain further detailed information of the services provided by the peer device to determine whether the peer device "actually" can provide such a service. As a result, by using a bitmask and key/value pair, certain peer devices that are not capable of providing a particular service can be quickly eliminated.

Figure 3:
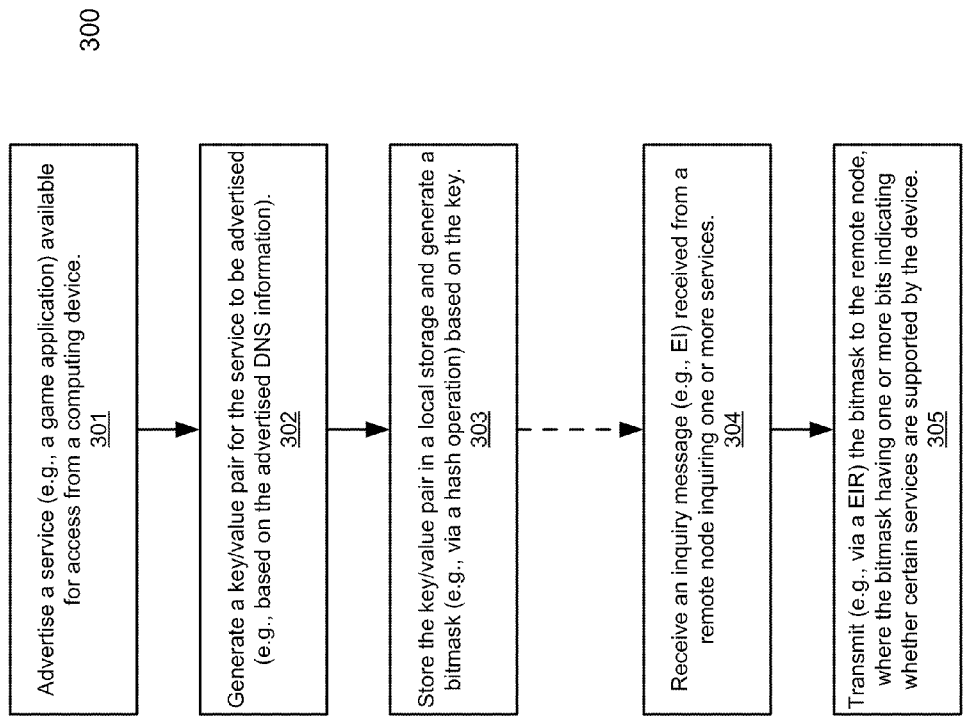
FIG. 3 is a flow diagram illustrating a method for advertising a service of a computing device according to one embodiment.

FIG. 3 is a flow diagram illustrating a method for advertising a service of a computing device according to one embodiment. Note that method 300 may be performed by processing logic which may include software, hardware, or a combination of both. For example, method 300 may be performed by device 220 of FIG. 2 or alternatively, by service discovery layer 104 and/or wireless layer 105 of device 102 in FIG. 1. Referring to FIG. 3, at block 301, a request for advertising a service such as a gaming application is received. In response to the request, at block 302, a key/value pair is generated for the service to be advertised. The key/value pair is generated based on DNS information associated with the service being advertised.

At block 303, the key/value is stored in a local storage and a bitmask is generated based on the key, for example, via a hash operation. The bitmask includes a single bit at a certain bit location corresponding to the key to indicate that the service is supported by the local computing device. Such a bitmask is also referred to as a service bitmask. If multiple services are supported by the device, there may be multiple bits in the bitmask that have a predetermined logical value (e.g., logical value of TRUE), each indicating a particular service supported by the device. Subsequently, at block 304, an inquiry (e.g., EI inquiry) is received from a remote device inquiring one or more services. In response, at block 305, the service bitmask is returned to the remote device, which is used by the remote device to determine whether a particular service is supported by the local device.

Figure 4:
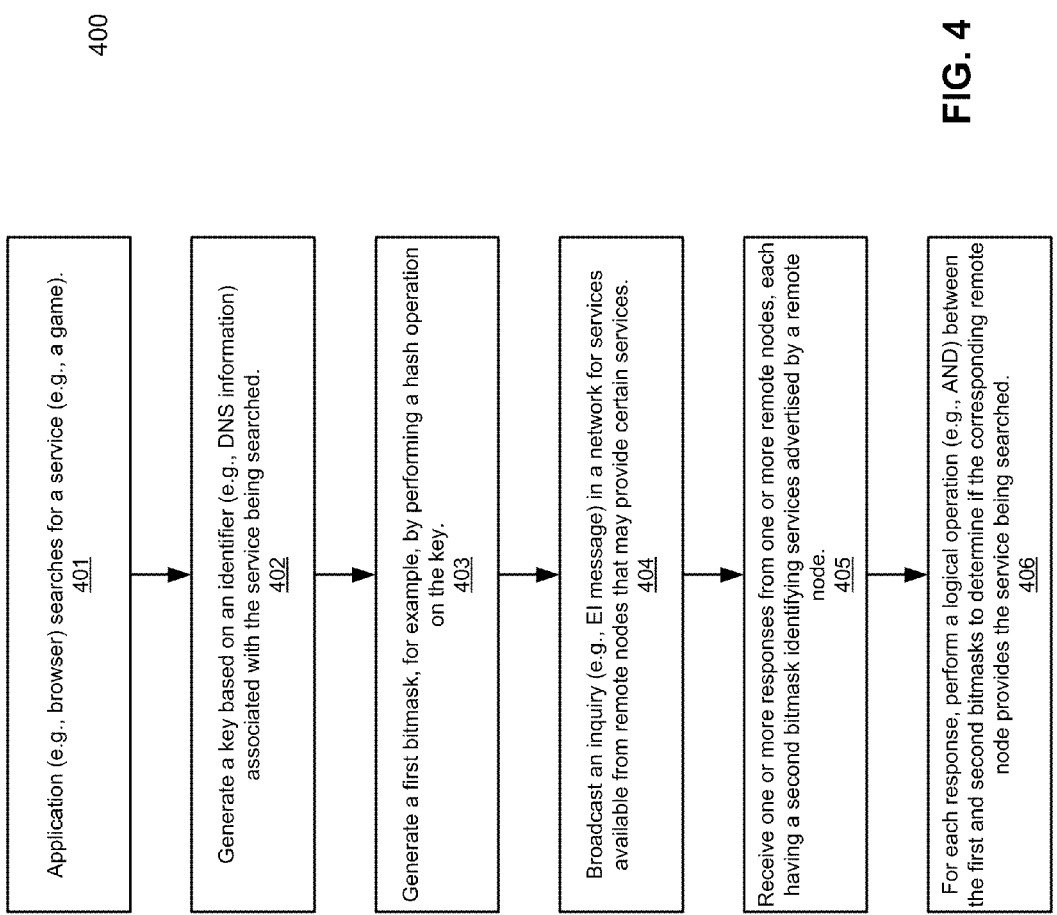
FIG. 4 is a flow diagram illustrating a method for discovering a service provided by a peer device according to one embodiment.

FIG. 4 is a flow diagram illustrating a method for discovering a service provided by a peer device according to one embodiment. Note that method 400 may be performed by processing logic which may include software, hardware, or a combination of both. For example, method 400 may be performed by device 210 of FIG. 2 or alternatively, by service discovery layer 114 and/or wireless layer 115 of device 101 in FIG. 1. Referring to FIG. 4, at block 401, a request is received for searching a service (e.g., game) from an application such as a browser. In response to the request, a DNS packet (e.g., DNS query packet) is created, where the DNS packet includes certain information (e.g., name) identifying the service being searched. At block 402, a key is generated based on the DNS packet. In addition, at block 403, a bitmask is generated based on the key. For example, the bitmask is generated by performing a hash operation on the key, which may generate a single bit bitmask that has a predetermined logical value (e.g., logical value of TRUE).

At block 404, an inquiry (e.g., EI message) is broadcast in a network searching for the service that may be available from one or more peer devices in the network. At block 405, each peer device in the network that receives the inquiry may respond with a service bitmask representing what service or services that each peer device can provide. At block 406, for each bitmask received, a logical operation (e.g., logical AND operation) is performed between the bitmask received from a remote peer device and the bitmask generated locally. The result of the logical operation is used to determine whether the service being searched is available from a particular peer device.

For example, if the locally generated bitmask is 0x04 (e.g., bit 2 has a logical value of TRUE) while the bitmask received from a remote peer device is 0x07 (e.g., bits 0-2 have logical value of TRUE), a logical AND operation between two bitmasks yields a result of 0x04. Here, a non-zero value at bit 2 of the result indicates that the service being searched may be supported by the remote peer device. Note that, a peer device may have multiple services that corresponding to the same bit of the bitmask. At this moment, the client device can only determine, based on the bitmask, that the remote device "may be" capable of providing the service being searched. In order to determine for sure that the remote device can provide the service being searched, the local device has to establish a connection with the remote device to obtain apropos key/value pairs and to examine them in order to determine whether the peer device "actually" supports the service being searched, which may take a longer time. However, by using a bitmask, a local device can quickly eliminate those peer devices that cannot provide the service being searched and focus on those devices that can. As a result, the efficiency for searching a service can be greatly improved.

According to one embodiment, a key/value pair is generated based on DNS information associated with the service being searched and/or advertised. For example, a name field and type field of a resource record (RR) in a DNS packet may be used to generate the key of a key/value pair, while a data field (e.g., RData field) of the RR may be used to generate the value of the key/value pair. In one embodiment, a name field of an RR may include a pointer such as a compression pointer (CP) pointing to a character string previously appeared in another RR or Question of the DNS packet without duplicating the entire character string in the name field. Similarly, the data field (e.g., RData field) may also include a compression pointer pointing to a string that appears in another RR or Question, or alternatively in the name field of the current RR without duplicating the entire string. Thus, the value of a key/value pair includes a pointer pointing to the key of the key/value pair while the key of the key/value pair includes a pointer pointing to another RR. As a result, a size of a key/value pair can be further reduced for the purpose of service discovery.

FIG. 5A is a block diagram illustrating a typical uncompressed DNS packet. As shown in FIG. 5A, DNS packet 500 is an uncompressed DNS packet having multiple Questions and RRs such as Question 501 and RR 502. Question 501 may include certain standard fields of a DNS question including name 503, as well as other fields such as type and class fields (not shown). Similarly, RR 502 includes name 504 and data field 505, as well as other fields (e.g., type, class). Typically, there are one or more domain names that may appear in multiple fields. In this example, strings of "_tcp" and "local" appear in both name fields 503 and 504, and maybe in some other fields (not shown). Such a duplication of strings may cause a DNS packet to be unnecessarily large.

In order to reduce the size of a DNS packet, a compression pointer (CP) is used to replace a subsequent appeared string by referencing a previous appearance of the string without reciting the entire string in the field, as shown in FIG. 5B.

Referring to FIG. 5B, instead of reciting the entire strings of "_tcp" and "local" in name field 504 of RR 502, compression pointer <ptr0> is used to reference to the same strings previously appeared in name field 503 of Question 501. For example, the pointer <ptr0> represents an offset from the beginning of the DNS packet to the bytes that encode the domain name "[4]_tcp[5]local[0]". As a result, instead of using 21 bytes to encode "[8]_example[4]_tcp[5]local[0]" only 11 bytes are used herein.

Similarly, RData field 505 may also use a pointer <ptr1> to reference to a string previously appeared in the DNS packet without having to repeat the entire string. For example, it is assumed that RData field 505 terminates in a string "[8]_example[4]_tcp[5]local[0]". Such a string can be replaced with a pointer <ptr1> pointing to the name field 504 that includes pointer <ptr0> referenced to name field 503.

According to one embodiment, a key 506 is comprised of a name field 508 and type field 509 generated from a question or resource record of the DNS packet, in this example, resource record 502. The name field 508 includes a pointer referenced to a string previously appeared in the DNS packet without reciting the entire string, as shown in FIG. 5C. Note that it is assumed that the DNS class used in the DNS packet is "IN" referring to the Internet class (the only DNS class in widespread use). The 2-byte DNS class in the DNS packet is replaced in Key 506 by a version identifier 510 identifying how the compression is performed on the domain name in name field 508. For example, the version identifier 510 indicates which in-memory DNS packet (also referred to as a compression dictionary) was used to create this key, such that the receiver of the key can decompress the key back into a full DNS name. Note that key 506 is described for the purpose of illustration only; other formats may also be applied. Further, the value 507 of a key/value pair is generated from a record data field (in this example, RData field 505) of the record having a pointer pointing to the name field of the resource record. That is, the value of a key/value pair includes a pointer referenced to the key of the key/value pair, and the key itself includes a pointer pointing to another domain name (e.g., name field 503) that is before the information used for the key in the DNS packet. This makes the size of a key/value pair even smaller.

FIG. 6 is a flow diagram illustrating a method for generating a key/value pair used in a service discovery procedure according to one embodiment. Note that method 600 may be performed by processing logic which may include software, hardware, or a combination of both. For example, method 600 may be performed by a service discovery layer and/or wireless layer of devices 101-102 of FIG. 1. Referring to FIG. 6, at block 601, DNS information is received for inquiring a service or advertising a service, where the DNS information includes one or more questions or resource records. At block 602, an in-memory DNS packet is created based on the DNS information. In the in-memory DNS packet, a subsequent appearance of a character string is replaced by a pointer referenced to a previous appearance of the string without repeating the entire character string. For example, the pointer represents an offset from the beginning of the DNS packet to the bytes that encode the character string. At block 603, the name, type, and data field of a record are extracted from the in-memory DNS packet. At block 604, a key is generated based on the extracted name and type, including a pointer referenced to a string previously appeared in the DNS packet without reciting the entire string. At block 605, a value is generated based on the extracted data field of the DNS packet, including a pointer referencing to data in the key or a previous domain name without reciting the entire data. At block 606, the key and value are used to search or advertise a service.

Figure 7:
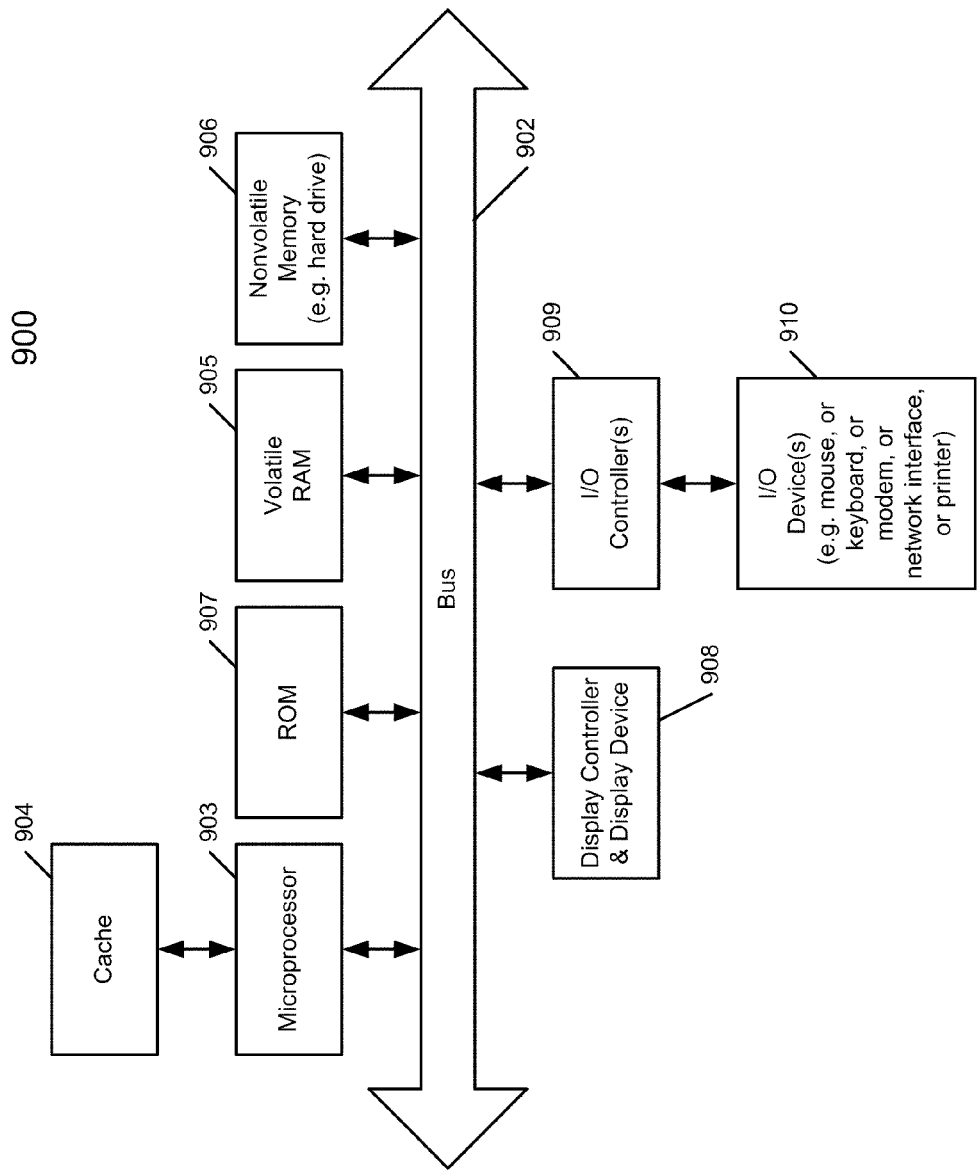
FIG. 7 is a block diagram of a data processing system, which may be used with one embodiment of the invention.

FIG. 7 is a block diagram of a data processing system, which may be used with one embodiment of the invention. For example, the system 900 may represent any computing device such as devices 101-102 of FIG. 1. Note that while FIG. 7 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 7 may, for example, be an Apple Macintosh computer or MacBook, or an IBM compatible PC.

As shown in FIG. 7, the computer system 900, which is a form of a data processing system, includes a bus or interconnect 902 which is coupled to one or more microprocessors 903 and a ROM 907, a volatile RAM 905, and a non-volatile memory 906. The microprocessor 903 is coupled to cache memory 904. The bus 902 interconnects these various components together and also interconnects these components 903, 907, 905, and 906 to a display controller and display device 908, as well as to input/output (I/O) devices 910, which may be mice, keyboards, modems, network interfaces, printers, and other devices which are well-known in the art.

Typically, the input/output devices 910 are coupled to the system through input/output controllers 909. The volatile RAM 905 is typically implemented as dynamic RAM (DRAM) which requires power continuously in order to refresh or maintain the data in the memory. The non-volatile memory 906 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 7 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 902 may include one or more buses connected to each other through various bridges, controllers, and/or adapters, as is well-known in the art. In one embodiment, the I/O controller 909 includes a USB (Universal Serial Bus) adapter for controlling USB peripherals. Alternatively, I/O controller 909 may include a wireless adapter such as a Bluetooth adapter, or a WiFi interface or an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A machine-implemented method for discovering a service in a wireless environment, the method comprising:
   receiving a service discovery request from a client application of a local device, wherein the service discovery request is to discover a service from one or more remote devices over a wireless network;
   computing a key and value pair (key/value pair) based on the service discovery request, the key/value pair representing the service to be discovered;
   generating a local bitmask based on the key of the key/value pair, the local bitmask including at least one bit having a predetermined logical value corresponding to a key of the key/value pair;

broadcasting an inquiry message in the wireless network, the inquiry message inquiring possible services possible provided by the remote devices over the wireless network;

receiving one or more remote bitmasks from the remote devices, each of the remote bitmasks including one or more bits corresponding to one or more services possibly provided by the remote devices, including receiving a first bitmask from a first remote device over the wireless network, the first bitmask having one or more bits that have a predetermined logical value, each representing a particular service provided by the first remote device; and for each of the remote bitmasks, comparing the remote bitmask with the local bitmask to determine whether a respective remote device is potentially capable of providing the requested service, including performing a logical operation between the first bitmask and the local bitmask, and determining whether the first remote device is potentially capable of providing the service being searched by the local device based on a result of the logical operation.

2. The method of claim 1, wherein the service discovery request is a domain name service (DNS) query packet having a service identifier identifying the requested service, and wherein the key/value pair is generated based on the service identifier of the DNS query packet.

3. The method of claim 1, wherein the logical operation is a logical AND operation, and wherein any bit remained in the result of the logical operation that has the predetermined logical value indicates that the first remote device is potentially capable of providing the service being searched.

4. The method of claim 1, further comprising:
establishing a session connection with the first remote device over the wireless network, if it is determined that the first remote device is potentially capable of providing the service being searched; and
receiving one or more key/value pairs from the first remote device over the session connection, each key/value pair corresponding to a bit of the first bitmask having the predetermined logical value.

5. The method of claim 4, wherein a value of a particular key/value pair includes further detailed information associated with a service that is identified by a key of the particular key/value pair.

6. The method of claim 5, further comprising examining each key/value pair received to determine whether the first remote device is actually capable of providing the service being searched.

7. The method of claim 2, wherein the DNS query packet further includes one or more resource records to specify detailed information of the requested service, wherein the key of the key/value pair is generated based on the service identifier of the DNS query packet, and wherein a value of the key/value pair is generated based on the one or more resource records of the DNS query packet.

8. The method of claim 1, wherein generating the local bitmask comprises hashing the key of the key/value pair using a predetermined hash function.

9. A non-transitory machine-readable storage medium having instructions stored therein, which when executed by a machine, cause the machine to perform a method for discovering services in a wireless environment, the method comprising:
receiving a service discovery request from a client application of a local device, wherein the service discovery request is to discover a service from one or more remote devices over a wireless network;
computing a key and value pair (key/value pair) based on the service discovery request, the key/value pair representing the service to be discovered;
generating a local bitmask based on the key of the key/value pair, the local bitmask including at least one bit having a predetermined logical value corresponding to a key of the key/value pair;
broadcasting an inquiry message in the wireless network, the inquiry message inquiring possible services possible provided by the remote devices over the wireless network;
receiving one or more remote bitmasks from the remote devices, each of the remote bitmasks including one or more bits corresponding to one or more services possibly provided by the remote devices, including receiving a first bitmask from a first remote device over the wireless network, the first bitmask having one or more bits that have a predetermined logical value, each representing a particular service provided by the first remote device;
for each of the remote bitmasks, comparing the remote bitmask with the local bitmask to determine whether a respective remote device is potentially capable of providing the requested service, including performing a logical operation between the first bitmask and the local bitmask, and determining whether the first remote device is potentially capable of providing the service being searched by the local device based on a result of the logical operation.

10. The non-transitory machine-readable storage medium of claim 9, wherein the service discovery request is a domain name service (DNS) query packet having a service identifier identifying the requested service, and wherein the key/value pair is generated based on the service identifier of the DNS query packet.

11. The non-transitory machine-readable storage medium of claim 9, wherein the logical operation is a logical AND operation, and wherein any bit remained in the result of the logical operation that has the predetermined logical value indicates that the remote device is potentially capable of providing the service being searched.

12. The non-transitory machine-readable storage medium of claim 9, wherein the method further comprises:
establishing a session connection with the first remote device over the wireless network, if it is determined that the first remote device is potentially capable of providing the service being searched; and
receiving one or more key/value pairs from the first remote device over the session connection, each key/value pair corresponding to a bit of the first bitmask having the predetermined logical value.

13. The non-transitory machine-readable storage medium of claim 12, wherein a value of a particular key/value pair includes further detailed information associated with a service that is identified by a key of the particular key/value pair.

14. The non-transitory machine-readable storage medium of claim 13, wherein the method further comprises examining each key/value pair received to determine whether the first remote device is actually capable of providing the service being searched.

15. The non-transitory machine-readable storage medium of claim 10, wherein the DNS query packet further includes one or more resource records to specify detailed information of the requested service, wherein the key of the key/value pair is generated based on the service identifier of the DNS query packet, and wherein a value of the key/value pair is generated based on the one or more resource records of the DNS query packet.

16. The non-transitory machine-readable storage medium of claim 9, wherein generating the local bitmask comprises hashing the key of the key/value pair using a predetermined hash function.

17. An apparatus for searching a service in a wireless environment, the apparatus comprising:
a service advertisement unit to receive a service discovery request from a client application of a local device, wherein the service discovery request is to discover a service from one or more remote devices over a wireless network;
a key and value (key/value) generator to generate a key/value pair based on the service discovery request, the key/value pair representing the service to be discovered;
a service bitmask generator to generate a local bitmask based on the key of the key/value pair, the local bitmask including at least one bit having a predetermined logical value corresponding to a key of the key/value pair, wherein the service advertisement unit is to broadcast an inquiry message in the wireless network, the inquiry message inquiring possible services possible provided by the remote devices over the wireless network;
a wireless communications interface to receive one or more remote bitmasks from the remote devices, each of the remote bitmasks including one or more bits corresponding to one or more services possibly provided by the remote devices, including a first bitmask from a first remote device over a wireless network, the first bitmask having one or more bits that have a predetermined logical value, each representing a particular service provided by the remote device; and
a wireless processing unit coupled to the wireless communications interface to perform a logical operation between the first bitmask and the local bitmask, and to determine whether the first remote device is potentially capable of providing the service being searched by the local device based on a result of the logical operation.

18. The apparatus of claim 17, further comprising:
an application programming interface (API) to receive a request for searching the service from an application, the request including an identifier identifying the service being searched; and
a service discovery unit coupled to the API to generate a second bitmask based on identifier identifying the service being searched and to pass the second bitmask to the wireless processing unit and wherein the wireless environment provides communication between devices which are compatible with an IEEE 802.11 standard.

19. The apparatus of claim 18, wherein the wireless processing unit is further configured to:
establish a session connection with the remote device over the wireless network, if it is determined that the remote device is potentially capable of providing the service being searched, and
receive one or more key/value pairs from the remote device over the session connection, each key/value pair corresponding to a bit of the first bitmask having the predetermined logical value.

20. A machine-implemented method for advertising a service in a wireless environment, the method comprising:
generating a key/value pair based on an identifier of a service to be advertised by a local device;
performing a hash operation on a key of the key/value pair to generate a bitmask, the bitmask including a bit having a predetermined logical value;
in response to an inquiry message from a remote device over a wireless network for searching for a service, transmitting the bitmask to the remote device over the wireless network to allow the remote device to determine whether the local device is potentially capable of providing a service being searched based on the bitmask, wherein the service is to be performed by the local device and received by the remote device;
establishing a session connection with the remote device over the wireless network, wherein the session connection is established if the remote device determines that the local device is potentially capable of providing the service being searched based on the bitmask; and
transmitting the key/value pair to the remote device over the wireless network to allow the remote device to determine whether the local device is actually capable of providing the service being searched based on the key/value pair, wherein the wireless environment provides communication between devices which are compatible with an IEEE 802.11 standard.

21. The method of claim 20, wherein the key/value pair is generated based on domain name system (DNS) information associated with the service being advertised.

22. A non-transitory machine-readable storage medium having instructions stored therein, which when executed by a machine, cause the machine to perform a method for advertising a service in a wireless environment, the method comprising:
generating a key/value pair based on an identifier of a service to be advertised by a local device;
performing a hash operation on a key of the key/value pair to generate a bitmask, the bitmask including a bit having a predetermined logical value;
in response to an inquiry message from a remote device over a wireless network for searching for a service, transmitting the bitmask to the remote device over the wireless network to allow the remote device to determine whether the local device is potentially capable of providing a service being searched based on the bitmask, wherein the service is to be performed by the local device and received by the remote device;
establishing a session connection with the remote device over the wireless network, wherein the session connection is established if the remote device determines that the local device is potentially capable of providing the service being searched based on the bitmask; and
transmitting the key/value pair to the remote device over the wireless network to allow the remote device to determine whether the local device is actually capable of providing the service being searched based on the key/value pair, wherein the wireless environment provides communication between devices which are compatible with an IEEE 802.11 standard.

23. The non-transitory machine-readable storage medium of claim 22, wherein the key/value pair is generated based on domain name system (DNS) information associated with the service being advertised.

24. An apparatus for advertising a service in a wireless environment, the apparatus comprising:
a service discovery unit to generate a key/value pair based on an identifier of a service to be advertised by a local device; and
a wireless processing unit coupled to the service discovery unit to perform a hash operation on a key of the key/ value pair to generate a bitmask, the bitmask including a bit having a predetermined logical value, wherein in response to an inquiry message from a remote device over a wireless network for searching for a service, the wireless processing unit is configured to transmit the bitmask to the remote device over the wireless network to allow the remote device to determine whether the local device is potentially capable of providing a service being searched based on the bitmask, wherein the service is to be performed by the local device and received by the remote device, wherein the wireless processing unit is further configured to establish a session connection with the remote device over the wireless network, wherein the session connection is established if the remote device determines that the local device is potentially capable of providing the service being searched based on the bitmask, and transmit the key/value pair to the remote device over the wireless network to allow the remote device to determine whether the local device is actually capable of providing the service being searched based on the key/value pair and wherein the wireless environment provides communication between devices which are compatible with an IEEE 802.11 standard.

25. The apparatus of claim 24, wherein the key/value pair is generated based on domain name system (DNS) information associated with the service being advertised.

* * * * *